United States Patent [19]

Stokes

[11] Patent Number: 4,625,392
[45] Date of Patent: Dec. 2, 1986

[54] METHOD OF MANUFACTURING A MOLDED ROTATABLE ASSEMBLY FOR DYNAMOELECTRIC MACHINES

[75] Inventor: Vijay K. Stokes, Schenectady, N.Y.

[73] Assignee: General Electric Company, Schenectady, N.Y.

[21] Appl. No.: 772,819

[22] Filed: Sep. 5, 1985

[51] Int. Cl.[4] .............................................. H02K 15/02
[52] U.S. Cl. .................................. 29/598; 264/272.19; 310/42; 310/156
[58] Field of Search ...................... 29/598; 264/272.19, 264/272.20; 310/156, 42

[56] References Cited

U.S. PATENT DOCUMENTS

| | | | |
|---|---|---|---|
| 2,060,260 | 11/1936 | Spengler | 29/598 |
| 3,221,194 | 11/1965 | Blackburn | 310/156 |
| 3,246,187 | 4/1966 | Toshio | 264/272.20 |
| 3,531,670 | 9/1970 | Loudon | 310/156 |
| 4,242,610 | 12/1980 | McCarty et al. | 310/156 |
| 4,327,302 | 4/1982 | Hershberger | 310/156 |
| 4,456,846 | 6/1984 | Stokes | 264/272.20 |

FOREIGN PATENT DOCUMENTS 244108  3/1963  Australia ........................ 264/272.20

Primary Examiner—Howard N. Goldberg
Assistant Examiner—P. W. Echols
Attorney, Agent, or Firm—Jeffrey L. Brandt; James C. Davis, Jr.; Paul R. Webb, II

[57] ABSTRACT

A method of making a rotor for a dynamoelectric machine comprises the steps of forming a plurality of flux ring segments of flux conducting material. Segments of magnetizable material are then secured to each of the flux ring segments to form a ring-segment magnetizable material subassembly. A plurality of subassemblies are situated in a cylindrically shaped molding ring, with the magnetizable material adjacent to the inside walls of the molding ring. A shaft is situated in the molding ring along the axis of the cylindrical molding ring. A plastic material is molded around the shaft and inside the ring-segment-magnetizable material subassemblies whereby the outermost surfaces of the magnet material define a cylinder.

5 Claims, 10 Drawing Figures

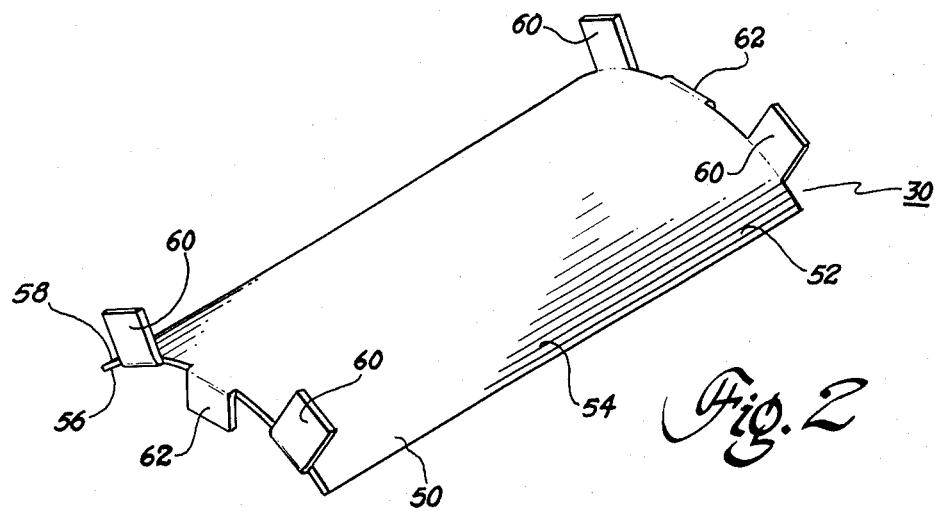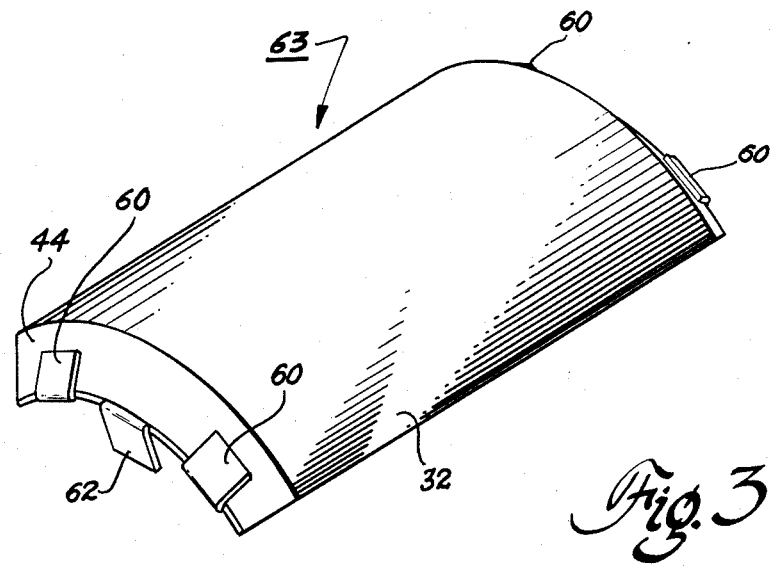

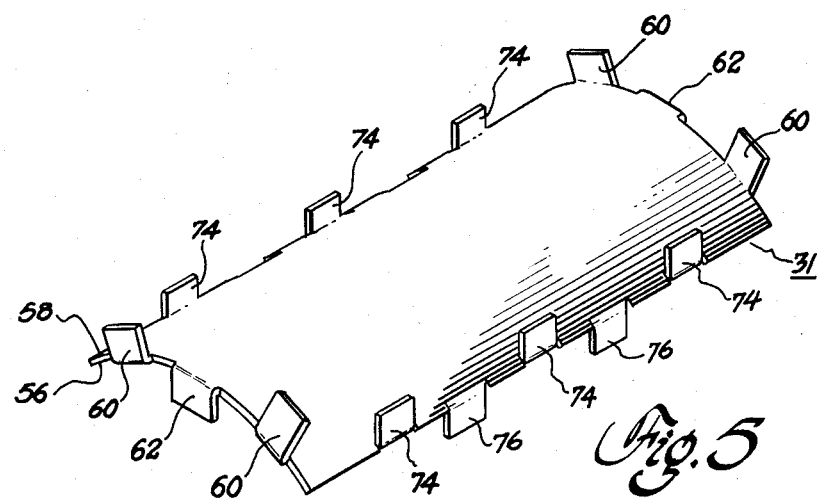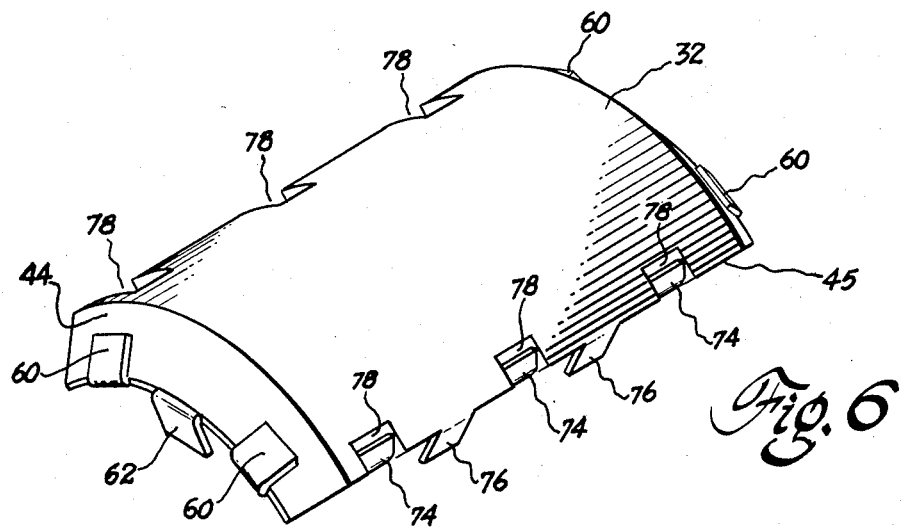

METHOD OF MANUFACTURING A MOLDED ROTATABLE ASSEMBLY FOR DYNAMOELECTRIC MACHINES

RELATED APPLICATIONS

This patent application is related to application Ser. No. 625,608 now U.S. Pat. No. 4,594,525, which is a continuation-in-part of application Ser. No. 507,878, now abandoned, filed June 27, 1983, both of which are filed in the name of the present inventor and assigned to the present assignee.

BACKGROUND OF THE INVENTION

This invention relates to rotatable assemblies for dynamoelectric machines, such as electronically commutated motors. More particularly, it relates to a rotatable assembly which uses a molded matrix between the shaft and the flux ring, and to a method of fabricating such assemblies.

In past designs of rotatable assemblies for dynamoelectric machines, such as, for example, electronically commutated motors, permanent magnets are typically adhesively bonded to the outer surface of a steel drum which is attached to a rotatable shaft. In some designs, the steel drum comprises a plurality of stacked steel laminations mounted on the outer surface of a steel shell. In many applications for electronically commutated motors, the rotors used therein employ the same designs as used for existing induction motor rotors and include aluminum induction motor bars. However, for electronically commutated motors and the like, neither the stacked steel laminations nor the aluminum bars serve any significantly beneficial electromagnetic function. For such applications, all that is needed in order to provide a medium of distribution for the magnetic flux generated by the magnets is a steel shell. Since eddy current losses are not a concern, the use of steel laminations is not necessary. Similarly, the aluminum bars are not necessary, and make the rotor more costly. Also, using a steel drum directly attached to the shaft is a relatively expensive use of materials for transmitting the electromagnetic torque generated by the magnets to the shaft, and further adds to the weight of the assembly. What is desired, then, is a light, inexpensive flux ring, a means for mechanically locking the permanent magnets to the ring, and a light, inexpensive means for transmitting torque from the flux ring to the rotor shaft.

Various schemes have been employed to retain magnet material elements, such as permanent magnets or the like, against displacement from their proper positions in a rotatable assembly for dynamoelectric machines. Once such scheme is described in U.S. Pat. No. 4,327,302, issued Apr. 27, 1982 to Doran D. Hershberger. In that patent, a plurality of magnet material elements in the form of bars are abutted between adjacent pole pieces of a rotatable assembly, with the magnet elements encapsulated in part by rotor bars cast between the adjacent pole pieces. The bars are integral with opposite end rings also cast on the rotatable assembly. Other patents, such as U.S. Pat. Nos. 4,242,610 and 3,531,670, describe heat shrinking a metal or metal alloy sleeve or band around the rotor core into displacement-preventing engagement with a set of magnet material elements, with the magnet elements arranged or otherwise seated in assembly positions about the circumference of the rotor core. While such an arrangement provides mechanical locking of the magnet elements to the rotor core, it requires undesirable heating during assembly, is also too bulky and cumbersome for some applications, and is relatively expensive. Also, for some dynamoelectric machines, the eddy current losses due to such metallic bands may significantly affect motor efficiency. Furthermore, if the retaining bands are formed from steel, they may create a short circuit of the magnetic flux, resulting in reduced torque output per unit of current input to the motor. U.S. Pat. No. 3,221,194 describes dipping a rotor core with permanent magnet material elements arranged thereon into a plastic bath. When cured, the plastic forms an encapsulating layer over both the rotor core and the magnet elements, securing them together. However, such a procedure also adds to the complexity of the assembly process.

Application Ser. No. 625,608, now U.S. Pat. No. 4,594,525, by the present inventor and assigned to the present assignee, discloses a rotatable assembly in which the magnet elements are mechanically locked to a generally cylindrically shaped flux ring. The flux ring with the magnet elements fastened thereto is attached to the rotor shaft by a plastic matrix molded between the shaft and the flux ring. The present invention provides a similar rotatable assembly, but employs a segmented flux ring in place of the continuous flux ring described in application Ser. No. 625,608, now U.S. Pat. No. 4,594,525. Employing a segmented flux ring provides the advantage that the rotatable assembly can be easily formed to provide the proper rotor-stator air gap, without requiring tight tolerances for the flux ring and magnet elements.

Accordingly, it is an object of the present invention to provide a method for making a rotor for a dynamoelectric machine which employs a light, inexpensive flux ring and a light, inexpensive means for transmitting torque from the flux ring to the rotor shaft.

It is another object of the present invention to provide a rotor in which the variations in radial magnet dimensions is compensated for to avoid rotor to stator air gap dissymmetries.

SUMMARY OF THE INVENTION

In one aspect of the present invention a method of making a rotor for a dynamoelectric machine comprises the steps of forming a plurality of flux ring segments of flux conducting material. Segments of magnetizable material are then secured to each of said flux ring segments to form a ring-segment magnetizable material subassembly. A plurality of subassemblies are situated in a cylindrically shaped molding ring, with the magnetizable material adjacent to the inside walls of the molding ring. A shaft is situated in the molding ring along the axis of the cylindrical molding ring. A plastic material is molded around the shaft and inside the ring-segment-magnetizable material subassemblies whereby the outermost surfaces of the magnet material define a cylinder.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawing in which:

FIG. 2 is an isometric view schematically illustrating one embodiment of a flux ring segment in accordance with the present invention;

FIG. 3 is an isometric view schematically illustrating one embodiment of the manner in which a magnet element may be fastened to the flux ring segment shown in FIG. 2;

FIG. 5 is an isometric view schematically illustrating a flux ring segment in accordance with an alternative embodiment to that shown in FIG. 2;

FIG. 6 is a view similar to that of FIG. 3, schematically illustrating how the magnet element of the present invention may be fastened to the flux ring segment shown in FIG. 5;

DETAILED DESCRIPTION OF THE INVENTION

Figure 1:
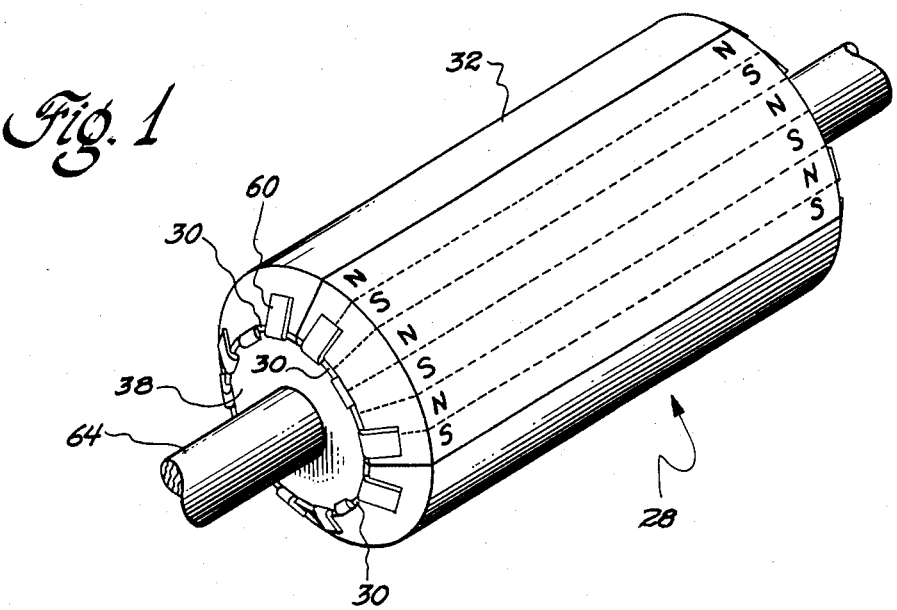
FIG. 1 is a perspective view of a molded rotor assembly in accordance with one embodiment of the present invention.

Referring now to the drawing wherein like numerals refer to like elements throughout, and particularly FIG. 1 thereof, a rotor 28 with surface magnets 32 suitable for use in an electrically commutated motor is shown. The rotor comprises a plurality of flux ring segments 30 of flux conducting material such as steel which can be fabricated by stamping held together by a plastic matrix 38.

The flux ring segment is shown in FIG. 2. The flux ring segment has a plurality of bendable tabs 60 and 62 on either longitudinal end. Referring to FIG. 3 a segment of magnetizable material 32 having an arcuate convex surface and chamfered ends is secured to the flux ring segment 30 with the arcuate convex surface facing away from the flux ring segment with the chamfered ends sloping inwardly as the radial distance increases. The magnetizable material, which can comprise ferrite ceramic material, can be secured by adhesive bonding and/or by bending tabs 60 over the magnet material to lock the magnet material in place to obtain a subassembly 63. Tabs 62 are bent away from the magnet material.

Figure 4:
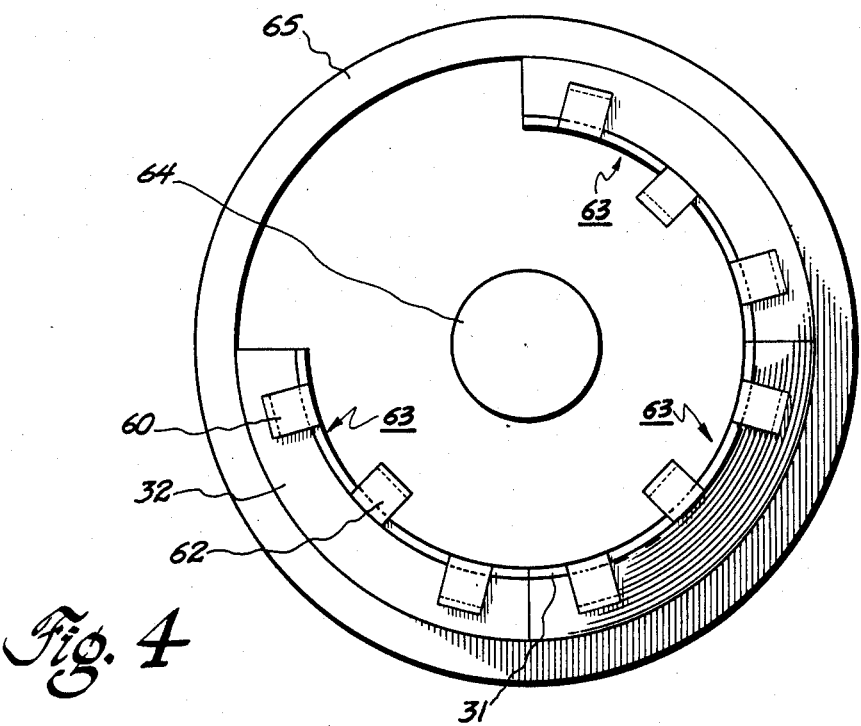
FIG. 4 is a top view of a molding ring with several ring segment magnetizable material subassemblies situated therein.

Referring now to FIG. 4, the subassemblies 63 comprising the flux ring segment 30 with a segment of magnetizable material 32 secured thereto, are placed in a cylindrical molding ring 65 with the convex magnetizable material surface situated adjacent the inner molding ring wall and with the subassemblies forming a ring. A shaft 64 is positioned along the longitudinal axis of the molding ring and plastic molding material (not shown in FIG. 2) such as phenolic is molded to form the rotor of FIG. 1. Tabs 62 firmly anchor the subassemblies to the plastic matrix. Improved bonding between the shaft and the plastic matrix can be achieved by using splines on the shaft which can be fabricated from steel.

By introducing the subassemblies into a molding ring and then molding, the outermost points on the surfaces of the magnet material are situated on a circular cylinder, thereby improving the rotor-stator air gap achieved. Further concentricity can be provided by a final machining/grinding operation. The last step in fabricating the rotor is to magnetize the magnetizable material. Referring to FIG. 1, each segment of magnetizable material when magnetized forms a plurality of poles with each pole extending the longitudinal length of the segment.

Figure 7:
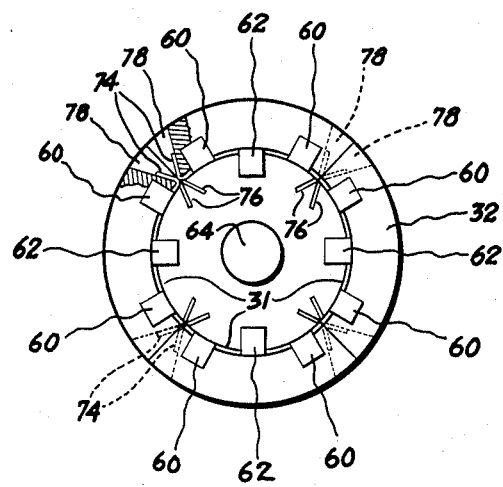
FIG. 7 is an end view partially cut away, schematically illustrating a rotatable assembly utilizing the embodiment for the flux ring segment shown in FIG. 5.

Referring now to FIGS. 5, 6 and 7, a flux ring segment 31 having bendable tabs 60, 62, 74 and 76 on either end as well as on either side of the segment is shown. The magnetizable material 32 when sintered can be formed with notches 78 or machined after sintering to permit tabs 74 to lock the magnetizable material in place along the sides of the flux ring segments so that the tabs do not extend beyond the outer, generally cylindrical, surface of the rotor and increase the rotor stator air gap.

Figure 8:
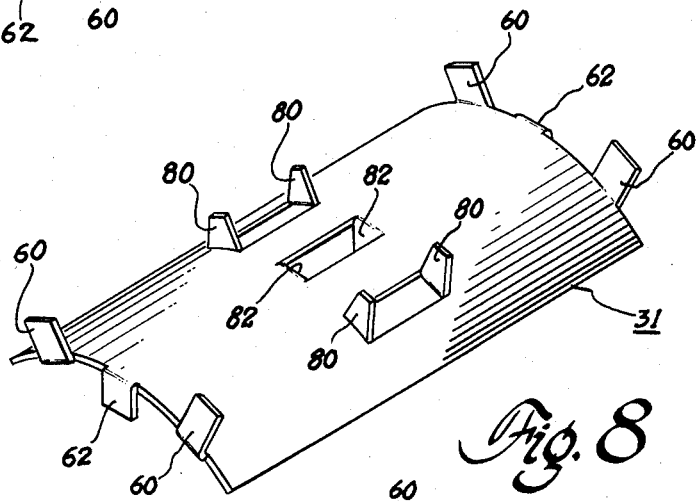
FIG. 8 is an isometric view schematically illustrating yet another embodiment of a flux ring segment in accordance with the present invention.
Figure 9:
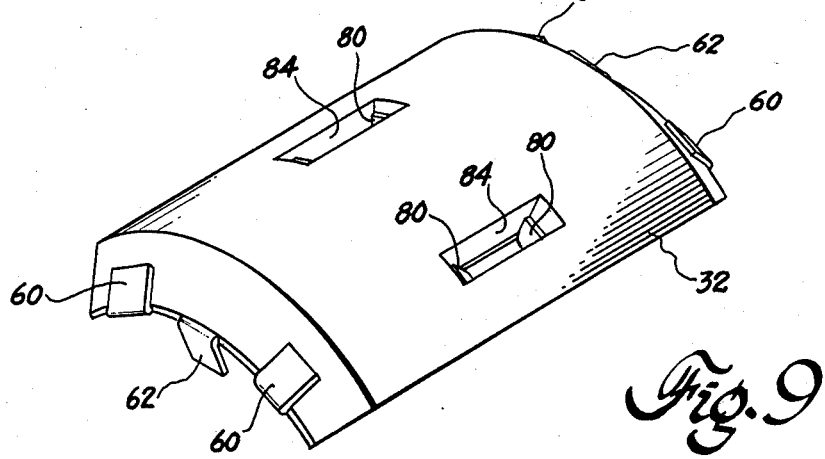
FIG. 9 is an isometric view schematically illustrating one embodiment of the manner in which the magnet element of the present invention may be fastened to the flux ring segment shown in FIG. 8.
Figure 10:
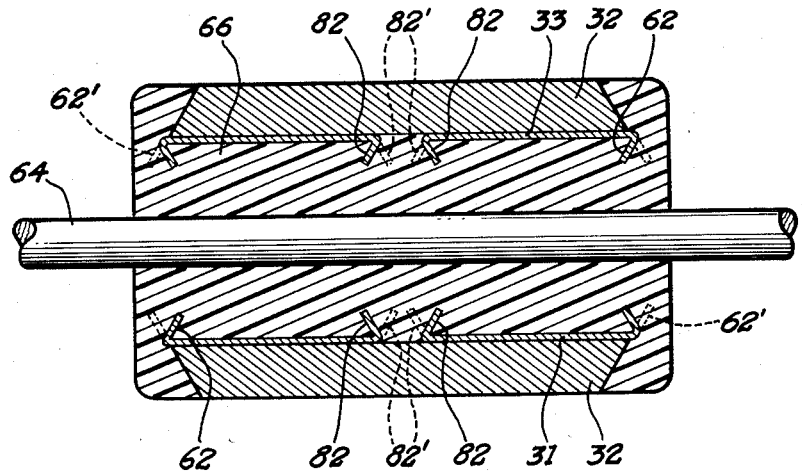
FIG. 10 is a side elevation, cross-sectional view of one embodiment of a molded rotor assembly utilizing the flux ring segment shown in FIG. 8.

Referring now to FIGS. 8, 9 and 10 a ring segment 31 for use with axially long magnets is shown. Tabs 80 and 82 are centrally situated between the ends of the ring segment with tabs punched from the segment material with tabs 80 extending above the segment surface and tabs 82 extending below the segment surface. The magnetizable material 32 has central apertures 84 permitting the tabs 80 to extend partially through the magnetizable material further securing the magnet, as shown in FIG. 9. Centrally located tabs 82 extend away from the magnetizable material into the plastic matrix providing additional support in an axially long rotor. Alternative positions are shown using dashed lines for elements 62 and 82 and are designated 62' and 82', respectively.

The foregoing describes a method for making a rotor for a dynamoelectric machine which employs a tight, inexpensive flux ring and a light inexpensive means for transmitting torque from the flux ring to the rotor shaft. In addition, the method described for making a rotor provides a rotor which the variations in radial magnet dimensions is compensated for to avoid rotor to stator air gap dissymmetries.

While the invention has been particularly shown and described with reference to several preferred embodiments thereof, it will be understood by those skilled in the art that various changes in form and detail may be made therein without departing from the true spirit and scope of the invention or defined by the appended claims.

What is claimed is:

1. A method of making a rotor for a dynamoelectric machine comprising the steps of:

forming a plurality of flux ring segmments of flux conducting material;

securing segments of magnetizable material to each of said flux ring segments to form a ring-segment magnetizable material subassembly;

situating a plurality of the subassemblies in a cylindrically shaped molding ring, with the magnetizable material adjacent the inside walls of the molding ring;

situating a shaft in the molding ring along the axis of the cylindrical molding ring; and molding plastic material around the shaft and inside the ring-segment magnetizable material subassemblies whereby the outermost surfaces of the magnetizable material define a cylinder.

2. The method of claim 1 wherein said segments of magnetizable material comprise segments having a concave surface which is situated adjacent the inner wall of the molding ring.

3. The method of claim 1 wherein said segments of magnetizable material are secured to said flux ring segments using bendable tabs extending from the edges of said flux ring.

4. The method of claim 1 wherein said flux ring segments of said subassemblies having bendable tabs extending from the ends bent away from the magnetizable material to anchor the subassemblies in the mold material.

5. The method of claim 1 wherein said ring segments of said subassemblies having centrally located tabs found between the ends of said flux ring segments formed by punching through the segment and bending the tabs formed from the surface of the segment so that the tabs extend above and below the segment surface, the magnetizable material defining a central aperture through which said tabs extend and lock said magnetizable material to said flux ring segment.

* * * * *